(12) United States Patent
Cao

(10) Patent No.: US 9,650,082 B2
(45) Date of Patent: May 16, 2017

(54) AUTOMOTIVE VEHICLE FLOOR ASSEMBLY AND VEHICLE EQUIPPED WITH SUCH FLOOR ASSEMBLY

(71) Applicant: FAURECIA BLOC AVANT, Nanterre (FR)

(72) Inventor: Yang Cao, Troy, MI (US)

(73) Assignee: FAURECIA BLOC AVANT, Nanterre (FR)

( * ) Notice: Subject to any disclaimer, the term of this patent is extended or adjusted under 35 U.S.C. 154(b) by 0 days.

(21) Appl. No.: 14/790,240

(22) Filed: Jul. 2, 2015

(65) Prior Publication Data

US 2016/0001822 A1    Jan. 7, 2016

(30) Foreign Application Priority Data

Jul. 4, 2014    (EP) .................................... 14306106

(51) Int. Cl.
| | | |
|---|---|---|
| B62D 25/20 | (2006.01) | |
| B60R 22/22 | (2006.01) | |
| B62D 27/02 | (2006.01) | |
| F16B 5/02 | (2006.01) | |
| F16B 11/00 | (2006.01) | |
| F16B 37/06 | (2006.01) | |

(52) U.S. Cl.
CPC .............. *B62D 25/20* (2013.01); *B60R 22/22* (2013.01); *B62D 27/02* (2013.01); *F16B 5/02* (2013.01); *F16B 11/006* (2013.01); *F16B 37/061* (2013.01)

(58) Field of Classification Search
CPC ........ B62D 25/20; B62D 27/02; B62D 21/09; B60R 22/22; F16B 5/02; F16B 11/006; F16B 37/061

USPC .................................... 296/193.07, 1.06, 30
See application file for complete search history.

(56) References Cited

U.S. PATENT DOCUMENTS

| | | | | |
|---|---|---|---|---|
| 5,997,068 A * | 12/1999 | Matsushita | ............ | B60N 2/015 296/198 |
| 6,485,055 B1 * | 11/2002 | Swayne | ............... | B60N 2/2806 280/801.1 |
| 6,634,710 B1 * | 10/2003 | Adamson, Sr. | ........ | B60N 2/289 248/503.1 |
| 2002/0190518 A1 * | 12/2002 | Kang | .................... | B21D 22/04 280/801.1 |

(Continued)

FOREIGN PATENT DOCUMENTS

| | | | |
|---|---|---|---|
| FR | 2789033 A1 * | 8/2000 | |
| FR | 2789033 A1 | 8/2000 | |

OTHER PUBLICATIONS

European Search Report dated Dec. 15, 2014, which issued during prosecution of European Application No. 14306106.7.

*Primary Examiner* — Jason S Morrow
*Assistant Examiner* — E Turner Hicks
(74) *Attorney, Agent, or Firm* — Troutman Sanders LLP

(57) ABSTRACT

The vehicle floor assembly comprises a floor and at least one attachment device for attachment of a vehicle safety component to the floor, the attachment device comprising a anchoring part for anchoring the attachment device to the floor and an attachment part for attaching a safety component to the attachment device.
The anchoring part is received and sandwiched between two opposed walls of a box structure of the floor, the attachment part being accessible through an opening provided in one of the two walls.

28 Claims, 2 Drawing Sheets

(56) References Cited

U.S. PATENT DOCUMENTS

2004/0227384 A1* 11/2004 Smallwood ............ B60N 2/289
                                                                297/253
2006/0049622 A1*  3/2006 Yamamoto ........... B60N 2/2809
                                                               280/801.1

* cited by examiner

AUTOMOTIVE VEHICLE FLOOR ASSEMBLY AND VEHICLE EQUIPPED WITH SUCH FLOOR ASSEMBLY

FIELD OF THE INVENTION

The invention relates to the field of vehicle floor assemblies forming a floor in an automotive vehicle.

BACKGROUND OF THE INVENTION

It is possible to provide the vehicle floor assembly comprising a floor to be secured to the structure of the vehicle and attachment devices for allowing fastening of safety components to the floor, the attachment devices being anchored to the floor.

Safety components are components involved in the safety of the passengers of the vehicle. Safety components namely include seats, seat belt attachments, child seat attachments, etc.

However, anchoring of attachment devices on the floor requires increasing thickness and/or material performances to be able to withstand high forces encountered during crash events.

SUMMARY OF THE INVENTION

An aim of the invention is to provide a vehicle floor assembly that can be lightweight with satisfactory safety performances.

To this end, the invention proposes a vehicle floor assembly comprising a floor and at least one attachment device for attachment of a vehicle safety component to the floor, the attachment device comprising a anchoring part for anchoring the attachment device to the floor and an attachment part for attaching a safety component to the attachment device, wherein the anchoring part is received and sandwiched between two opposed walls of a box structure of the floor, the attachment part being accessible through an opening provided in one of the two walls.

In specific embodiments, the vehicle floor assembly comprises the following optional features, in isolation or in combination:

the anchoring part is secured to each one of the two walls;
at least one of the two walls has an embossment protruding towards the other wall in register with an attachment device, the anchoring part being sandwiched between the embossment and the other wall;
the floor assembly comprises an attachment device having an anchoring part formed of a bracket comprising a flange contacting one of the walls and another flange contacting the other wall;
the attachment part comprises a head connected to the bracket and a shank extending from the head;
the floor assembly comprises an attachment device formed of wire shaped to form a loop-shaped attachment part and an anchoring part;
the floor assembly comprises an attachment device comprises a shank forming the attachment part and a head provided at one end of the shank, the head forming the anchoring part sandwiched between the two walls;
the floor assembly comprises an attachment device having an attachment part and an anchoring part distinct from one another and secured to each other;
the floor assembly comprises an attachment device having an attachment part and a anchoring part made in one single piece of material;
the anchoring part is secured to at least one or to each one of the two walls by welding and/or adhesive bonding;
the walls comprise an upper wall and a lower wall, the opening being defined in the upper wall;
the floor comprises two superposed floor plates assembled one to the other and forming the box structure, each plate forming a respective one of the two walls;
the two plates include a main plate and a reinforcing plate secured to the main plate;
the reinforcing plate only partially covers the main plate.

The invention also relates to an automotive vehicle comprising a floor assembly as defined above.

BRIEF DESCRIPTION OF THE DRAWINGS

The invention and its advantages will be better understood on reading the following description, given solely by way of example and with reference to the attached drawings in which.

DETAILED DESCRIPTION

Figure 1:
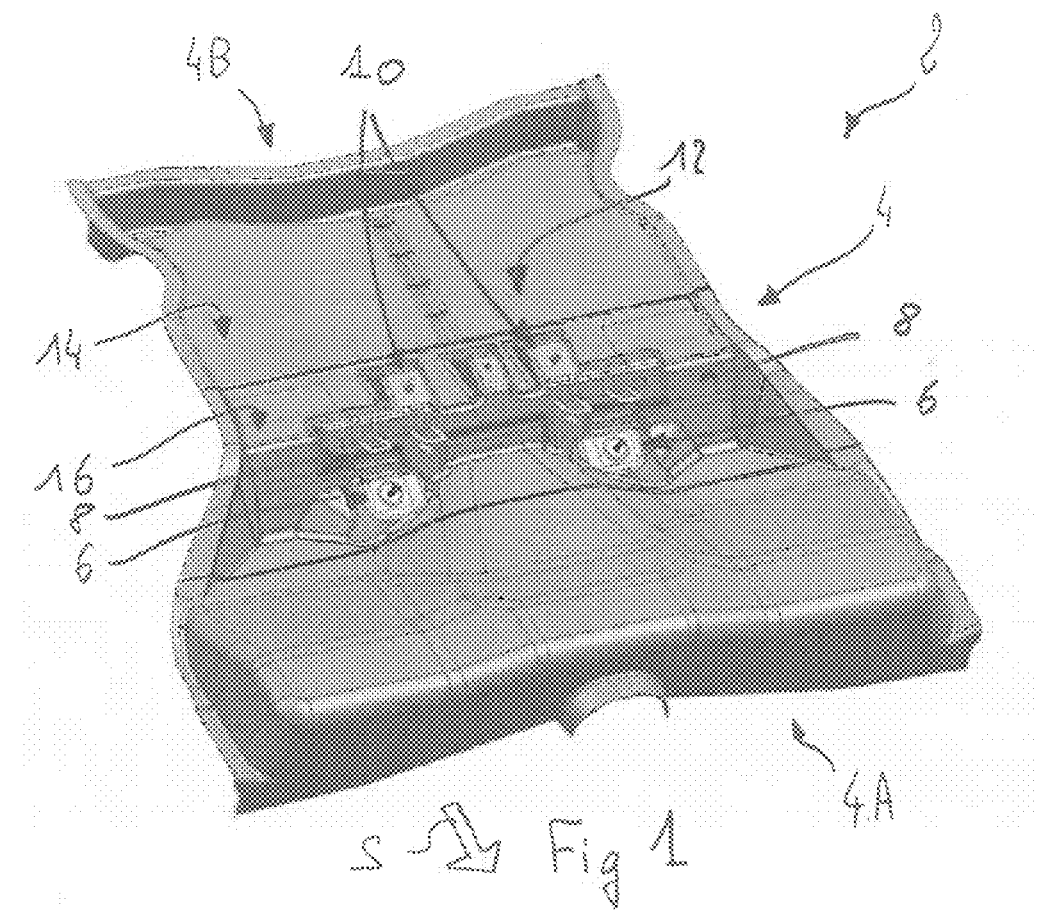
FIG. 1 is a perspective view of a vehicle floor assembly comprising a floor and attachment devices.

The vehicle floor assembly 2 of FIG. 1 comprises a vehicle floor 4 adapted for forming a floor of an automotive vehicle and attachment devices 6, 8, 10 for fastening safety components to the floor 4. Safety components include seats, seat belt attachments and child seat attachments.

In the following, the terms "longitudinal", "transversal", "front" and "rear", "top" and "bottom" are used with reference to the forward longitudinal direction of the vehicle illustrated by arrow S on FIG. 1.

The floor 4 is adapted to be integrally secured to the structure or body in white of the vehicle. The attachment devices are integrally anchored to the floor 4, such that safety components attached to the attachment device are in turn anchored to the structure of the vehicle.

The floor 4 illustrated on FIG. 1 is adapted to be installed in the rear part of the vehicle for supporting rear seats and defining a trunk. The floor 4 comprises a seat receiving part 4A and a trunk part 4B extending the seat receiving part 4A rearwards.

The attachment devices 6, 8, 10 include seat attachments, seat belt attachments and child seat attachments.

The floor 4 comprises a hollow box structure 12. More specifically, the floor 4 comprises a main plate 14 and a reinforcing plate 16 secured one to the other such as to define the box structure 12 between them. The box structure 12 aims at increasing rigidity of the floor 4.

The main plate 14 substantially defines the contour of the floor 4. In top view, the reinforcing plate 16 is of smaller dimensions than the main plate 14.

The reinforcing plate 16 is set over the main plate 14 and partially covers the main plate 14. The reinforcing plate 16 extends transversely on the entire width of the main plate 14. The main plate 14 extends rearwards and frontwards further than the reinforcing plate 16.

The main plate 14 is made of metal, of plastic material and/or a combination thereof. The metal can be any type of steels, aluminum, magnesium materials in the form of sheet forming or casting. The plastic material can be any type of thermoplastic or thermoset material processed by injection, compression molding, thermal forming, vacuum forming, resin transfer molding, etc. The plastic material is advantageously reinforced with synthetic and/or natural fibers. Synthetic fibers include glass fibers, carbon fibers and/or Kevlar® fibers. The fiber length can range from continuous to fraction of millimeter range.

The reinforcing plate 16 is made of metal, of plastic material and/or a combination thereof. The metal can be any type of steels, aluminum, magnesium materials in the form of sheet forming or casting. The plastic material can be any type of thermoplastic or thermoset material processed by injection, compression molding, thermal forming, vacuum forming, resin transfer molding, etc. The plastic material is advantageously reinforced with synthetic and/or natural fibers. Synthetic fibers include glass fiber, carbon fibers and/or Kevlar® fibers. The fiber length can range from continuous to fraction of millimeter range.

The reinforcing plate 16 is made of the same material than the main plate 14 or of a different material.

A material comprising a plastic matric reinforced with fibers is referred to as a Fiber Reinforced Material (FRM). A particularly suitable material for the main plate 14 and/or the reinforcing plate 16 is a Carbon Fiber Reinforced Material (CFRM).

Figure 2:
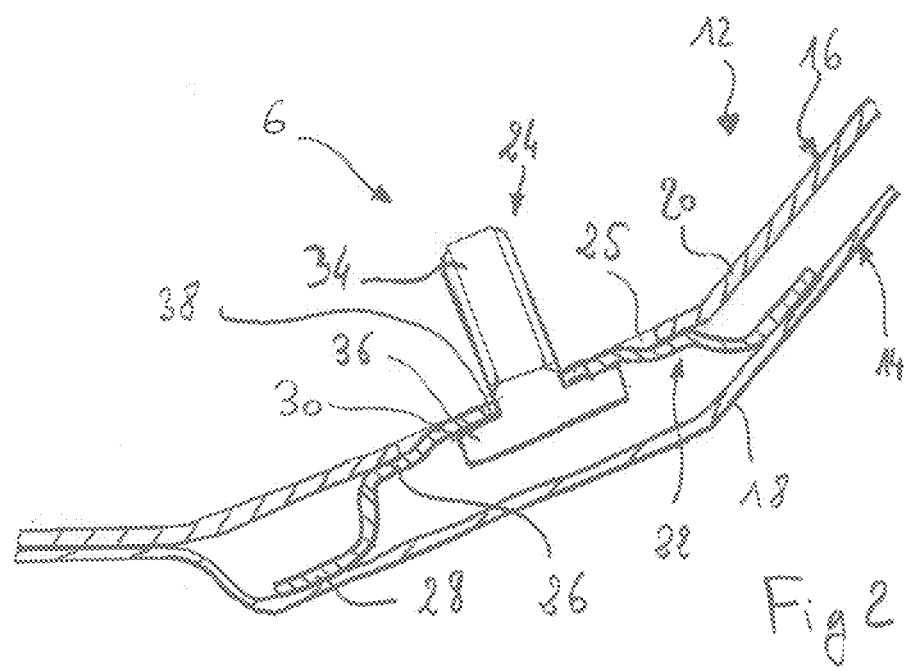
FIG. 2 is a sectional view of a box structure of the floor illustrating an attachment device.
Figure 3:
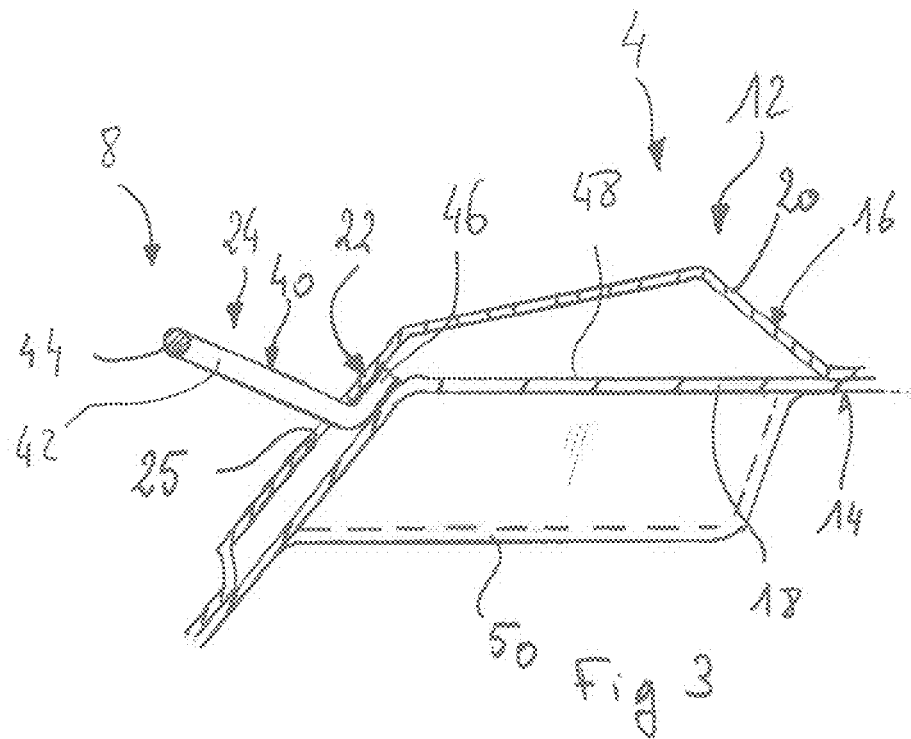
FIG. 3 is a sectional view of the box structure of the floor illustrating another attachment device.
Figure 4:
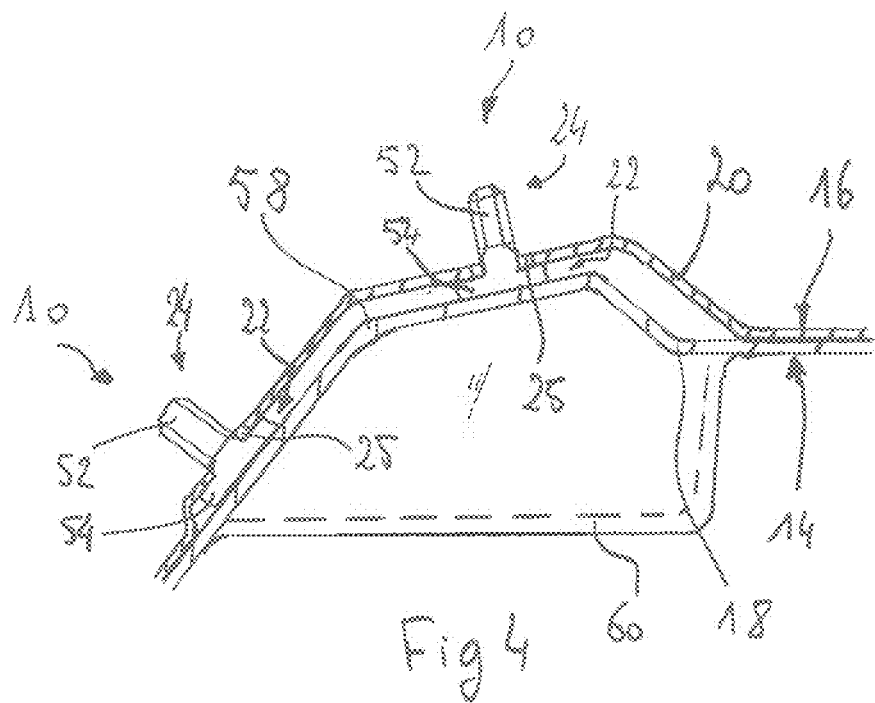
FIG. 4 is a sectional view of the box structure of the floor illustrating yet another attachment device.

As illustrated on FIGS. 2-4, the box structure 12 of the floor 4 is formed between the main plate 14 and the reinforcing plate 16. The main plate 14 forms a lower wall 18 of the box structure 12 and the reinforcing plate 16 forms an upper wall 20 of the box structure 12. The lower wall 18 and the upper wall 20 are spaced on from the other. The lower wall 18 and the upper wall 20 define a hollow internal cavity between them. The box structure 12 mechanically reinforces floor 4 by imparting rigidity to the floor 4.

The floor 4 assembly comprises attachment devices 6, 8, 10 of different kinds illustrated on FIG. 2-4.

Each attachment device 6, 8, 10 comprises a anchoring part 22 for securing the attachment device to the floor 4 and an attachment part 24 for fastening a safety component to the attachment device.

The anchoring part 22 is received in the internal cavity of the box structure 12 with being sandwiched between the upper wall 20 and the lower wall 18. The anchoring part 22 contacts each of the lower wall 18 and the upper wall 20. More specifically, the anchoring part 22 contacts each of the confronting faces of the lower wall 18 and the upper wall 20.

The anchoring part 22 is secured to each of the lower wall 18 and the upper wall 20, in particular to each of the confronting faces of the lower wall 18 and the upper wall 20. The anchoring part 22 is welded and/or adhesively bonded to each of the lower wall 18 and the upper wall 20, in particular to each of the confronting faces of the lower wall 18 and the upper wall 20.

The attachment part 24 is accessible from outside the box structure 12 through an opening 25 provided in the upper wall 20. More specifically, the attachment part 24 protrudes out of the box structure 12 through the opening 25 provided in the upper wall 20.

The attachment device 6 of FIG. 2 comprises a anchoring part 22 formed by a bracket 26 comprising a lower flange secured to lower wall 18 and an upper flange secured to the upper wall 20.

The bracket 26 is plate-shaped with one flange (here the lower flange) being formed by a peripheral region 28 of the bracket 26 and the other flange (here the upper flange) being formed by a central region 30 of the bracket 26 surrounded by the peripheral region 28. The attachment part 24 is integrally connected to the central region 30. The central region 30 closes the opening 25 of the upper wall 20.

The spacing between the lower wall 18 and the upper wall 20 in register with the anchoring part 22 is greater that the thickness of the bracket 26. The bracket 26 comprises an upset between the two flanges. The bracket 26 is thus cup-shaped.

The attachment part 24 of the attachment device 6 of FIG. 2 is distinct from the anchoring part 22 and secured to the anchoring part 22.

The attachment part 24 comprises a shank 34 and a head 36 provided at one end of the shank 34. The shank 34 extends through an aperture 38 of the bracket 26 with being retained by the head 36 which interferes with the edge of the aperture 38. The head 36 is optionally secured to the bracket 26 by welding and/or adhesive bonding. The aperture 38 is provided in the central region 30 of the bracket 26. The shank 34 is optionally threaded.

The attachment device 6 of FIG. 2 is for example a seat attachment device for permanent fastening of seats to the floor 4.

The attachment device 8 of FIG. 3 is formed of a metal wire 40 shaped to form a loop-shaped attachment part 24 and an anchoring part 22.

In the present embodiment, the attachment part 24 has two branches 42 connected by an intermediate section 44 and the anchoring part 22 is formed by extensions 46 of the branches of the attachment part. Only one branch 42 and one extension 46 are visible on FIG. 3. Each extension 46 is inclined with respect to the corresponding branch 42, with an elbow between the branch 42 and the extension 46. Each extension 46 contacts both the lower wall 18 and the upper wall 20. The attachment part 24 extends from the extensions 46 with protruding out of the box structure 12 through the opening 25 of the upper wall 20. The attachment part 24 is for example U-shaped.

The anchoring part 22 is sandwiched between the lower wall 18 and the upper wall 20. More specifically, the lower wall 18 comprises a local embossment 48 protruding towards the inside of the box structure 12 in register with the attachment device 8, the anchoring part 22 being sandwiched between the apex of the embossment 48 of the lower wall 18 and the upper wall 20. The apex of the embossment 48 is closer to the upper wall 20 than adjacent regions 50 of the lower wall 18.

The attachment device 8 of FIG. 2 is for example a child seat attachment device for temporary removable fastening of a child seat to the floor 4. The attachment device advantageously satisfies the ISOFIX standard.

Two similar attachment devices 10 are illustrated on of FIG. 4. Each attachment device 10 comprises a shank 52 forming the attachment part 24 and a head 54 provided at one end of the shank 52 and forming the anchoring part 22. The head 54 is received in the internal cavity of the box structure 12 with being sandwiched between the lower wall 18 and the upper wall 20 and secured to each one of the lower wall 18 and the upper wall 20, preferably by welding and/or bonding. The head 54 contacts both the lower wall 18 and the upper wall 20. The shank 52 extends from the head 54 through the opening 25 of the upper wall 20. The head 54 has larger dimensions than that of the opening such as to interfere with the edge of the opening, thus retaining the attachment device 10. The shank 54 is advantageously externally threaded for bolting of a safety component.

In the embodiment of FIG. 4, the lower wall 18 comprises a local embossment 58 in register with each attachment device 10, with the head 54 of each attachment device 10 forming the anchoring parts 22 being sandwiched between the apex of the embossment 58 of the lower wall 18 and the upper wall 20. The apex of the embossment 58 is closer to the upper wall 20 than adjacent regions 60 of the lower wall 18.

The attachment devices of FIG. 4 are for example seat belt attachment devices each for securing a seat belt end or a seat belt fastener to the floor 4.

The floor 4 provided with a box structure 12 is mechanically reinforced. In addition, sandwiching the anchoring part 22 of a safety component attachment device between two walls of the box structure 12 further reinforces the floor 4 as the anchoring part 22 of the attachment device acts as in insert received in the box structure 12. Reinforcement of the floor 4 is further enhanced by securing the anchoring part 22 to the two opposed walls 18, 20 of the box structure 12 between which the anchoring part 22 is sandwiched. Besides, securing of the attachment device is also enhanced, thus improving safety performances.

The floor 4 assembly is obtained easily and at low cost. Enhanced reinforcement of the vehicle floor assembly 2 allows reducing the thickness of the floor plates thus reducing the overall weight of the vehicle floor assembly 2, whilst maintaining the same mechanical and safety performances.

The invention is not limited to the exemplary embodiments disclosed above.

In one embodiment, the reinforcing plate 16 is secured below the main plate 14 instead of being above the main plate 14. The reinforcing plate 16 forms the lower wall 18 of the box structure 12 and the main plate 14 forms the upper wall 20 of the box structure 12. In this case, the openings through which the attachment parts of the attachment devices are accessible and/or protrude are provided in the main plate 14.

In one embodiment, the reinforcing plate 16 extends to the front end and/or to the rear end of the main plate 14. In one particular embodiment, the reinforcing plate 16 extends over the whole extend of the main plate 14 whereby the floor 4 is entirely formed of two superposed plates on its whole extend, thus forming a box-floor.

In one embodiment, the reinforcing plate 16 extends only partially over the width of the main plate 14.

In the embodiments of FIGS. 3 and 4, the lower wall of the box structure is provided with an embossment protruding upwardly towards the upper wall. In an alternative, the upper wall is provided with an embossment protruding downwardly towards the lower wall and sandwiching an anchoring part of an attachment member with the lower wall.

In an alternative embodiment, the lower wall and the upper wall each have inwardly protruding embossments in register, said embossments sandwiching an anchoring part of an attachment device between their apexes. The apex of each embossment for in a wall is closer to the other wall than adjacent regions of the wall.

The invention claimed is:

1. A vehicle floor assembly comprising:
   a floor, comprising:
      two superposed floor plates assembled one to the other and forming a box structure comprising at least two opposed walls, each floor plate forming a respective one of the two opposed walls of the at least two opposed walls; and
      an embossment disposed on at least one of the two opposed walls and protruding toward another of the two opposed walls; and
   at least one attachment device configured to attach a vehicle safety component to the floor and aligned with the embossment, the attachment device comprising:
      an anchoring part anchoring the attachment device to the floor and wedged in between the embossment and the other of the two opposed walls; and
      an attachment part configured to attach the safety component to the attachment device,
      wherein the attachment part is accessible through an opening provided in one of the two opposed walls.

2. The vehicle floor assembly as in claim 1, wherein the anchoring part is secured to each of the two walls.

3. The vehicle floor assembly as in claim 1, comprising an attachment device comprising an anchoring part formed of a bracket comprising a flange contacting one of the walls and another flange contacting the other wall.

4. The vehicle floor assembly as in claim 3, wherein the attachment part comprises a head connected to the bracket and a shank extending from the head.

5. The vehicle floor assembly as in claim 1, comprising an attachment device formed of wire shaped to form a loop-shaped attachment part and an anchoring part.

6. The vehicle floor assembly as in claim 1, wherein an attachment device comprises a shank forming the attachment part and a head provided at one end of the shank, the head forming the anchoring part wedged in between the two walls.

7. The vehicle floor assembly as in claim 1, comprising an attachment device having an attachment part and an anchoring part distinct from one another and secured to each other.

8. The vehicle floor assembly as in claim 1, comprising an attachment device having an attachment part and an anchoring part made in one single piece of material.

9. The vehicle floor assembly as in claim 1, wherein the anchoring part is secured to at least one or to each one of the two walls by welding.

10. The vehicle floor assembly as in claim 1, wherein the walls comprise an upper wall and a lower wall, the opening being defined in the upper wall.

11. The vehicle floor assembly as in claim 1, wherein the two plates include a main plate and a reinforcing plate secured to the main plate.

12. The vehicle floor assembly as in claim 1, wherein the reinforcing plate only partially covers the main plate.

13. An automotive vehicle comprising a floor assembly as in claim 1.

14. The vehicle floor assembly as in claim 1, wherein the embossment is a local embossment.

15. The vehicle floor assembly as in claim 1, wherein the embossment comprises an apex that is disposed closer to the other wall than adjacent regions of the wall.

16. A vehicle floor assembly comprising:
   a floor comprising:
      two superposed floor plates assembled one to the other and forming a box structure comprising at least two opposed walls, each floor plate forming a respective one of two opposed walls of the at least two opposed walls; and
   at least one attachment device configured to attach a vehicle safety component to the floor, the attachment device comprising:
      an anchoring part bracket anchoring the attachment device to the floor comprising:

a first flange disposed on at least one of the two opposed walls; and a second flange disposed on another of the two opposed walls; and an attachment part configured to attach the safety component to the attachment device, wherein the anchoring part bracket is received and wedged in between the two opposed walls, and wherein the attachment part is accessible through an opening provided in one of the two opposed walls.

17. The vehicle floor assembly as in claim 16, wherein the anchoring part bracket is plate shaped.

18. The vehicle floor assembly as in claim 17, wherein the anchoring part bracket is cup-shaped.

19. The vehicle floor assembly as in claim 18, wherein spacing between the two opposed walls between which the anchoring part bracket is wedged is greater than a thickness of the anchoring part bracket.

20. The vehicle floor assembly as in claim 17, wherein one of the first and second flanges is a peripheral region of the anchoring part bracket and the other of the first and second flanges is a central region of the anchoring part bracket.

21. The vehicle floor assembly as in claim 20, wherein the attachment part is integrally connected to the central region.

22. The vehicle floor assembly as in claim 16, wherein the first flange contacts the at least one of the two opposed walls and is spaced from the other of the two opposed walls, the second flange contacts the other of the two opposed walls and is spaced from the one of the two opposed walls.

23. A vehicle floor assembly comprising:

a floor, comprising a box structure comprising at least two opposed walls; and at least one attachment device configured to attach a vehicle safety component to the floor, the attachment device comprising:

an attachment part configured to attach the safety component to the attachment device, formed u-shaped and comprising two extensions connected by an intermediate part;

an anchoring part formed from the two extensions and anchoring the attachment device to the floor; and wherein the attachment device is formed wire shaped to form the attachment part and the anchoring part, wherein each of the two extensions of the anchoring part is received and wedged in between two opposed walls of the at least two opposed walls, and wherein the attachment part is accessible through an opening provided in one of the two opposed walls.

24. The vehicle floor assembly of claim 23, wherein each extension contacts each of the two opposed walls.

25. The vehicle floor assembly of claim 23, wherein each extension is secured to each of the two opposed walls by at least one of welding and adhesive.

26. The vehicle floor assembly of claim 23, wherein the attachment device is a child seat attachment.

27. The vehicle floor assembly of claim 23, wherein the attachment device is compliant with ISOFIX standards.

28. The vehicle floor assembly as in claim 1, wherein the anchoring part is secured to at least one or to each one of the two walls by adhesive bonding.

* * * * *